Aug. 10, 1965
L. H. COOK ETAL
3,200,148
UREA SYNTHESIS PROCESS
Filed Aug. 29, 1962
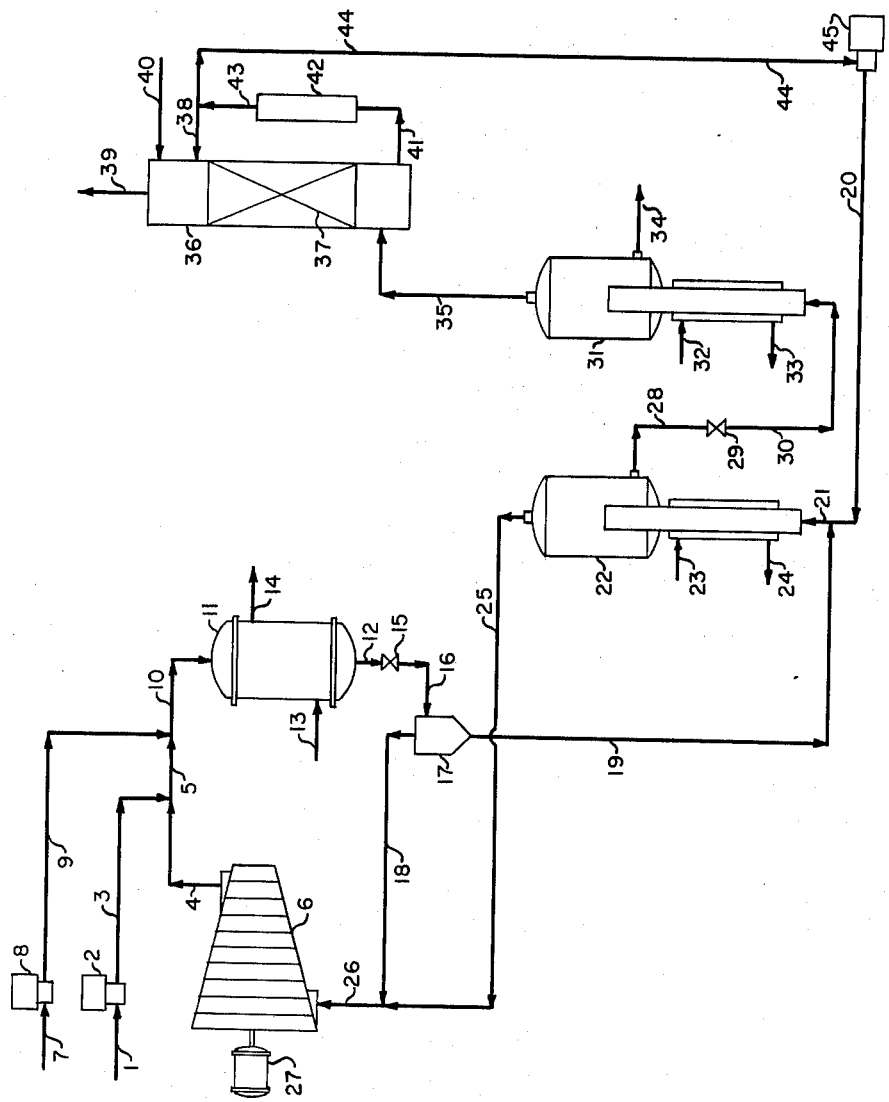
LUCIEN H. COOK
IVO MAVROVIC
*INVENTORS*
BY J. L. Chabot
AGENT

United States Patent Office 3,200,148
Patented Aug. 10, 1965

3,200,148
UREA SYNTHESIS PROCESS
Lucien H. Cook, Port Washington, and Ivo Mavrovic, New York, N.Y., assignors to Chemical Construction Corporation, New York, N.Y., a corporation of Delaware
Filed Aug. 29, 1962, Ser. No. 220,339
4 Claims. (Cl. 260—555)

This invention relates to the synthesis of urea ammonia and carbon dioxide. An improved method for total recycle of unconverted reactants has been developed, which accomplishes direct recycle by adiabatic compression of the unconverted reactants as a hot gas stream, and thereby permits the recovery of process reaction heat as usable process steam.

Numerous procedures have been developed or proposed for the recycle of unconverted reactants in urea synthesis. Thus, it has been proposed to recycle these reactants to the urea synthesis autoclave as an aqueous ammonia-ammonium carbamate solution or slurry. Another commercial process is based on the use of a hydrocarbon oil as the slurrying agent for ammonium carbamate. Finally, it has been broadly proposed in the past to recycle the reactants as a hot gas stream, which is compressed at elevated temperature. In such a procedure, it is necessary to maintain the gas stream above the temperature level at which solid ammonium carbamate is condensed, in order to prevent excessive wear in the compressor due to solids abrasion. This process is described in U.S. Patent No. 1,429,483. In addition, a discussion of a commercial application of the process in Germany is given in P.B. Report No. 47,773, entitled, "Urea Manufacture at I.G. Farbenindustrie." The process of the present invention is an improved procedure using the broad concept of hot gas recycle as disclosed in these prior art references.

In the present invention, the recycling mixed gas stream is compressed by means of a substantially adiabatic axial or centrifugal compressor. The resulting gas stream is discharged from the compressor at a very high temperature level. The hot gas stream is quenched to a lower level by the addition of compressed feed streams of liquid ammonia and gaseous carbon dioxide. Then the mixed process stream is cooled by heat exchange with liquid water, which is converted to steam. During the heat exchange step and under the process conditions of elevated pressure and temperature, a portion of the mixed process stream reacts to form urea. The resulting process stream is then passed to a lower pressure level, and a mixed off-gas stream containing ammonia, carbon dioxide and water vapor is separated from the product aqueous urea solution. The mixed off-gas stream is then recycled to the compressor.

This process sequence has several noteworthy advantages. Because the recycle stream is adiabatically compressed, substantially all of the overall exothermic heat of reaction in urea synthesis, including the heat of ammonium carbamate condensation, is recovered as usable process steam. Thus, when the feed streams of ammonia and carbon dioxide are added to the compressed hot recycle gas stream, a mixed process stream is formed at a sufficiently elevated temperature level to provide high pressure steam in the subsequent heat exchange. Sufficient steam is generated to eliminate outside steam or other external utility requirements. In addition, adding the feed streams to the hot recycle gas stream after it has been compressed serves to quench the gas stream, thus preventing possible ammonia decomposition due to high temperature. The conventional ammonium carbamate absorption and recycle equipment of the prior art, such as high pressure absorption equipment and the carbamate solution recycle pump, have now been eliminated. The extremely large urea synthesis autoclave or reactor of the prior art has also been eliminated, since at high temperature the urea synthesis reaction proceeds rapidly and sufficient retention time is provided in the heat exchanger. Finally, the prior art with respect to ammonium carbamate recycle involved the heating of the process stream to generate off-gas, which was subsequently condensed to ammonium carbamate using cooling water. Thus, the heat of condensation was wasted and in addition cooling water was required. In the present invention, the off-gas is not condensed, but instead is directly recycled to adiabatic compression, and thus the heat of condensation is subsequently recovered at a high temperature level via steam generation. In addition, cooling water requirement for carbamate condensation is eliminated. The generated steam is subsequently employed in carbamate decomposition, thus eliminating external steam requirements.

In most prior art processes the urea synthesis reaction has been carried out by heating up to the optimum reaction temperature. In practically every instance the reaction temperature has been kept below 375° F. However, it has been proven that it is possible to go to a much higher conversion at elevated temperature with the advantage of minimum retention time. Thus, at 410° F. a very brief retention time is required to attain reaction equilibrium. In the process of the present invention, the reaction is carried out by approaching the ideal temperature from the high temperature side. As the temperature of the reaction mixture decreases through optimum temperature zones, the advantage of high equilibrium conversions at these temperatures is also attained. The actual retention time required is therefore extremely small. In addition, due to the approach from the high temperature side, the overall average conversion of carbamate to urea is relatively high. Thus, relatively less carbamate must be recycled per unit of urea formed, and the process may be operated with very high excess of ammonia with the compressor handling an off-gas stream which is essentially ammonia.

It is an object of the present invention to synthesize urea in an improved complete recycle process.

Another object is to produce urea in a process in which reaction heat is recovered as usable high pressure steam.

A further object is to synthesize urea at a high temperature level at which faster and more complete conversion is attained.

An additional object is to synthesize urea in a process sequence which achieves substantially complete recovery of the heat of reaction at usable temperature levels.

Still another object is to recycle the off-gas from a urea synthesis process in an improved manner.

Still a further object is to provide a complete recycle urea process in which outside utility requirements for steam and cooling water are eliminated.

An object is to produce urea in an improved manner.

These and other objects and advantage of the present invention will become evident from the description which follows. Referring to the figure, gaseous or liquid ammonia feed stream 1 is compresssed by pump 2 to urea synthesis pressure, which is usually in the range of 2000 p.s.i.g. to 6000 p.s.i.g. It is generally preferable to employ gaseous ammonia rather than liquid. If liquid ammonia is provided, a vaporizer-preheater may be employed in stream 3. The compressed ammonia feed stream 3 is added to hot recycle gas stream 4 to form a mixed process stream 5. Gas stream 4 is derived at an elevated temperature usually in the range of 600° F. to 1000° F. from compressor 6, and the addition of stream 3 serves to immediately quench stream 4 to a lower temperature level, thereby preventing the decomposition of ammonia in stream 4.

Gaseous carbon dioxide feed stream 7 is comprssed in compressor 8 to urea synthesis pressure, and the resulting compressed gas stream 9 is added to stream 5 to form a mixed urea synthesis process stream 10. Stream 10 is thus formed at an elevated pressure in the range of 2000 p.s.i.g. to 6000 p.s.i.g. and a temperature preferably in the range of 350° F. to 500° F. Stream 10 is now passed into heat exchange unit 11, which may be of any suitable design. Thus unit 11 may consist of a tubular heat exchanger or steam boiler, or unit 11 may simply consist of a vessel provided with an internal coil through which process stream 10 is passed. In any case, stream 10 is cooled in unit 11, to a temperature preferably in the range of 300° F. to 400° F., and leaves as stream 12. While the mixed process stream is retained in unit 11, urea formation takes place. Thus stream 12 contains urea, ammonium carbamate, excess ammonia and water. Liquid water is passed into unit 11 via 13 for heat exchange with the process stream, and leaves via 14 as high temperature steam. Thus, the prior art requirement of cooling water for cooling of stream 10 is obviated.

Stream 12 is now processed in a suitable manner to separate an off-gas containing unconverted ammonia and carbon dioxide from the product aqueous urea solution. Thus, in a preferred embodiment of the present invention, stream 12 is passed through pressure reducing valve 15, leaving as stream 16 at a pressure typically in the range of 200 p.s.i.g. to 400 p.s.i.g. Stream 16 is passed to cyclonic flash separator 17, which is a suitable vessel for separating evolved off-gas from the residual liquid solution. The off-gas, which is evolved due to pressure reduction, is removed from vessel 17 via 18. A portion of stream 18 may be purged, not shown, to remove inerts from the system. The residual liquid solution leaves vessel 17 via 19, and is preferably combined with aqueous recycle stream 20, which is derived in a manner to be described infra.

The combined stream 21 is passed into ammonium carbamate decomposer unit 22, where decomposition of a portion of the ammonium carbamate in the stream is attained by suitable heating. Unit 22 may be of any suitable configuration, with one typical arrangement being shown in the figure. Stream 21 is heated while passing upward through the lower stream-jacketed section of the unit, by steam passing into the jacket via 23 with condensate removal via 24. A portion of the ammonium carbamate present is decomposed to ammonia and carbon dioxide, and further off-gas is separated from residual liquid solution in the upper section of unit 22. The off-gas is removed via 25, and is combined with off-gas stream 18. The combined stream 26 is now passed into compressor 6, for compression prior to recycle. Unit 6 is a suitable axial or centrifugal type of compressor, which achieves substantially adiabatic compression of the recycling gas stream. Compressor 6 is driven by a motor 27.

Referring now to decomposer unit 22, the residual liquid stream with lowered ammonium carbamate content is withdrawn via 28, and is passed through pressure reducing valve 29. The resulting stream 30, at a reduced pressure in the range of 5 p.s.i.g. to 50 p.s.i.g., is now passed into low pressure ammonium carbamate decomposer 31. Unit 31 is similar to unit 22 described supra. Thus, stream 30 rises through the lower steam-jacketed section of unit 31, which is heated by steam admitted via 32 with condensate removal via 33. The decomposition of the balance of the ammonium carbamate present in the liquid stream is thus achieved, and a liquid stream consisting of product aqueous urea solution is withdrawn via 34 from the upper section of unit 31.

The mixed off-gas generated in unit 31 is removed via 35 and passed to absorber 36. Unit 36 is provided with a packed section 37, or other gas-liquid contact means. A circulating stream 38 of aqueous solution is passed into unit 36 above section 37, and passes downward countercurrent to the rising gas stream. Ammonia and carbon dioxide from stream 35 are absorbed into the liquid solution, and residual gas consisting essentially of inerts is discharged via 39 to purge. A small stream 40 consisting of makeup water is admitted into the top of unit 36. The scrubbing solution is removed via 41 from the bottom of unit 36, suitably cooled in cooler 42, removed via 43, and partially recycled via 38 to unit 36. The balance of stream 43 is passed via 44 to pump 45, and is compressed to a pressure in the range of 200 p.s.i.g. to 400 p.s.i.g. for recycle via 20. The ammonia and carbon dioxide content of stream 20 is eventually recycled to urea synthesis via 25.

It will be evident to those skilled in the art that various alternatives may be practiced within the scope of the present invention. Thus, unit 17 and its function may be omitted if desired, with stream 16 passing directly to unit 252. This variation is relatively less desirable, because the extra gas evolution in the steam-jacketed section of unit 22 reduces the heat transfer coefficient thus making unit 22 less efficient. In addition, this variation is also less desirable because proportionately more water vapor will be present in the recycling off-gas stream. Other alternative methods of off-gas generation and recycle besides those described may be adopted. It will be apparent that stream 4 may alternatively be first combined with stream 9, and then with stream 3. Absorber 36 and its function may alternatively be carried out by means of the process described in U.S. Patent No. 3,038,285, in which case pump 45 may also be omitted.

Another important alternative procedure within the scope of the present invention should be mentioned. This comprises the provision of more than two stages of carbamate decomposition at different pressure levels. Thus, besides the two stages of carbamate decomposition described supra, operating at 200–400 p.s.i.g. and 5–50 p.s.i.g. respectively, further stages of carbamate decomposition may be provided at higher pressure levels. For example, the process stream 12 derived from unit 11 may be initially passed to a carbamate decomposer operating at a pressure in the range of 1000 to 1200 p.s.i.g. An off-gas would thus be generated at this pressure level, and residual carbamate in the process stream would be decomposed and removed as off-gas at lower pressures. The lower pressure off-gas is then compressed to the 1000–1200 p.s.i.g. range, combined with the initial off-gas generated at that pressure level, and the combined off-gas stream is then compressed to urea synthesis pressure. This alternate would be advantageous since less power would be consumed in off-gas compression, and maximum heat recovery would be attained.

A further important aspect of the present invention involves the utilization of the stream 14 consisting of high pressure steam. This is preferably first passed through an expansion turbine which operates an electric generator or other mechanical power consumer. Then the turbine exhaust steam is employed as carbamate decomposer steam, via streams 23 and 32. This arrangement permits maximum utilization of both the sensible heat and the latent heat of condensation of the steam.

An example of an industrial application of the process of the present invention will now be described.

*Example*

A urea synthesis process stream was prepared in accordance with the present invention. The synthesis reaction effluent 12 leaving the heater section of the steam generation unit 11 is flashed down from 3200 p.s.i.g. to 300 p.s.i.g. The flashed gas goes overhead from the flash separator 17 and the bottom liquor stream 19 is fed to the first decomposer 22. The operating conditions of this decomposer are approximately 250 p.s.i.g. to 300 p.s.i.g. and 300° F. Approximately 90% of the carbamate is decomposed and the resulting off-gas, together with the overhead gas from flash separator 17, is fed to the suction of centrifugal compressor 6.

The gas mixture, containing ammonia, carbon dioxide and water vapor, is compressed from 300 p.s.i.g. to 3200 p.s.i.g. The discharge temperature of the gas at high pressure is approximately 800° F. At the point where the high pressure gas stream 4 leaves the compressor, input feed streams of gaseous ammonia and gaseous carbon dioxide are added. These cold fluids quench the hot gas and the resulting mixture 10 enters the high pressure tubes of a steam generation unit. The ammonia and carbon dioxide mixed with the compressor discharge represents the ammonia and carbon dioxide consumed in the process to produce urea. The reaction and the production of urea takes place as soon as ammonium carbamate is formed, essentially at a temperature of 400° F. to 500° F. Thus, the reaction requires a very short retention time to attain equilibrium. The volume corresponding to the heat transfer surface in the steam generation unit 11 suffices as the reactor retention time, thus a separate reactor or autoclave unit is not required in the process.

The urea and residual carbamate solution leaving the first decomposer 22 undergoes letdown and is fed to the second decomposer 31 operating at 15 p.s.i.g. The overhead gas mixture of ammonia, carbon dioxide and water vapor is condensed in absorber 36. A saturated solution of carbamate is made with necessary feed water. The heat is removed by circulating through a cooler. The net carbamate solution produced is transferred by pump 45 from 15 p.s.i.g. to the 300 p.s.i.g. level and is mixed with the bottoms from the flash separator. The combined solution is fed to the first decomposer 22. The bottoms from the second decomposer 31 undergoes pressure letdown to a vacuum evaporator in which the product urea solution is produced.

What we claim is:

1. Urea synthesis process with total recycle of unconverted process components which comprises compressing input streams of ammonia and carbon dioxide to urea synthesis pressure in the range of 2000 p.s.i.g. to 6000 p.s.i.g., combining said input streams with a gaseous recycle stream whereby said recycle stream is quenched and a combined urea synthesis stream is formed at a temperature in the range of 350° F. to 500° F., cooling said combined stream in heat exchange with liquid water to a temperature in the range of 300° F. to 400° F., whereby said water is converted to steam and a portion of said combined stream is converted to urea, heating the resulting stream at reduced pressure to decompose ammonium carbamate, removing off-gas comprising unconverted ammonia and carbon dioxide together with water vapor, recovering a final process stream comprising product aqueous urea solution, compressing said off-gas in substantially adiabatic compression means to urea synthesis pressure in the range of 2000 p.s.i.g. to 6000 p.s.i.g. whereby said stream is heated to a temperature in the range of 600° F. to 1000° F., and recycling the compressed stream to urea synthesis as said gaseous recycle stream.

2. Urea synthesis process with total recycle of unconverted process components, which comprises compressing input streams of ammonia and carbon dioxide to urea synthesis pressure in the range of 2000 p.s.i.g. to 6000 p.s.i.g., combining said input streams with a gaseous recycle stream whereby said recycle stream is quenched and a combined urea synthesis stream is formed at a temperature in the range of 350° F. to 500° F., cooling said combined stream in heat exchange with liquid water to a temperature in the range of 300° F. to 400° F., whereby said water is converted to steam and a portion of said combined stream is converted to urea, reducing the pressure of the resulting stream to the range of 200 p.s.i.g. to 400 p.s.i.g., removing a first off-gas comprising unconverted ammonia and carbon dioxide together with water vapor, reducing the pressure of the residual stream to the range of 5 p.s.i.g. to 50 p.s.i.g., removing a second off-gas comprising unconverted ammonia and carbon dioxide together with water vapor, recovering a final process stream comprising product aqueous urea solution, combining said first and second off-gas streams, compressing the combined off-gas stream in substantially adiabatic compression means to urea synthesis pressure in the range of 2000 p.s.i.g. to 6000 p.s.i.g. whereby said stream is heated to a temperature in the range of 600° F. to 1000° F., and recycling the compressed stream to urea synthesis as said gaseous recycle stream.

3. Urea synthesis process with total recycle of unconverted process components which comprises compressing input streams of ammonia and carbon dioxide to urea synthesis pressure in the range of 2000 p.s.i.g. to 6000 p.s.i.g., combining said input streams with a gaseous recycle stream whereby said recycle stream is quenched and a combined urea synthesis stream is formed at a temperature in the range of 350° F. to 500° F., cooling said combined stream in heat exchange with liquid water to a temperature in the range of 300° F. to 400° F., whereby said water is converted to steam and a portion of said combined stream is converted to urea, reducing the pressure of the resulting stream to the range of 200 p.s.i.g. to 400 p.s.i.g., removing a first off-gas comprising unconverted ammonia and carbon dioxide together with water vapor, heating the residual stream to decompose ammonium carbamate, removing a second off-gas comprising unconverted ammonia and carbon dioxide together with water vapor, reducing the pressure of the residual stream to the range of 5 p.s.i.g. to 50 p.s.i.g., heating the residual stream to decompose ammonium carbamate, removing a third off-gas comprising unconverted ammonia and carbon dioxide together with water vapor, recovering a final process stream comprising product aqueous urea solution, combining said first, second and third off-gas streams, compressing the combined off-gas stream in substantially adiabatic compression means to urea synthesis pressure in the range of 2000 p.s.i.g. to 6000 p.s.i.g. whereby said stream is heated to a temperature in the range of 600° F. to 1000° F., and recycling the compressed stream to urea synthesis as said gaseous recycle stream.

4. Urea synthesis process with total recycle of unconverted process components which comprises compressing input streams of ammonia and carbon dioxide to urea synthesis pressure in the range of 2000 p.s.i.g. to 6000 p.s.i.g., combining said input streams with a gaseous recycle stream whereby said recycle stream is quenched and a combined urea synthesis stream is formed at a temperature in the range of 350° F. to 500° F., cooling said combined stream in heat exchange with liquid water to a temperature in the range of 300° F. to 400° F., whereby said water is converted to steam and a portion of said combined stream is converted to urea, reducing the pressure of the resulting stream to the range of 200 p.s.i.g. to 400 p.s.i.g., removing a first off-gas comprising unconverted ammonia and carbon dioxide together with water vapor, combining the residual stream with aqueous recycle solution, heating the combined stream to decompose ammonium carbamate, removing a second off-gas stream comprising unconverted ammonia and carbon dioxide together with water vapor, reducing the pressure of the residual stream to the range of 5 p.s.i.g. to 50 p.s.i.g., heating the residual stream to decompose ammonium carbamate, removing a third off-gas stream comprising unconverted ammonia and carbon dioxide together with water vapor, recovering a final process stream comprising product aqueous urea solution, absorbing said third off-gas stream in aqueous absorbent solution, recycling said absorbent solution as said aqueous recycle solution, combining said first and second off-gas stream, compressing the combined off-gas stream in substantially adiabatic compression means to urea synthesis pressure in the range of 2000 p.s.i.g. to 6000 p.s.i.g. whereby said stream is heated to a temperature in the range of 600° F. to 1000° F., and recycling the compressed stream to urea synthesis as said gaseous recycle stream.

References Cited by the Examiner

UNITED STATES PATENTS 1,429,483   9/22   Bosch et al. _____ 260—555

OTHER REFERENCES

Dewling et al.: Fiat Final Report No. 889, September 3, 1946, pages 1–6 and 13.

NICHOLAS S. RIZZO, *Primary Examiner.*